US010043103B2

(12) United States Patent
Dodballapur et al.

(10) Patent No.: US 10,043,103 B2
(45) Date of Patent: Aug. 7, 2018

(54) SYSTEM AND METHOD FOR OBJECT MATCHING

(71) Applicant: CANON KABUSHIKI KAISHA, Tokyo (JP)

(72) Inventors: Veena Murthy Srinivasa Dodballapur, Artarmon (AU); Kewen Liao, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/189,795

(22) Filed: Jun. 22, 2016

(65) Prior Publication Data
US 2016/0379085 A1 Dec. 29, 2016

(30) Foreign Application Priority Data

Jun. 26, 2015 (AU) ................................ 2015203591

(51) Int. Cl.
*G06K 9/62* (2006.01)
*G06K 9/00* (2006.01)

(52) U.S. Cl.
CPC ....... *G06K 9/6202* (2013.01); *G06K 9/00778* (2013.01); *G06K 9/6215* (2013.01)

(58) Field of Classification Search
CPC . G06K 9/6202; G06K 9/00778; G06K 9/6215
USPC ................ 382/218, 219, 220, 181, 209; 1/1; 370/241, 259; 435/6.11, 283.1; 534/657, 534/732; 536/23.1; 707/749; 711/125, 711/135; 712/235; 714/124, E11.207; 715/229, 234, 239; 455/41.1, 73
See application file for complete search history.

(56) References Cited

U.S. PATENT DOCUMENTS

| | | | | |
|---|---|---|---|---|
| 5,858,659 | A * | 1/1999 | Sapolsky | ............. B01J 19/0046 435/6.11 |
| 7,178,131 | B2 * | 2/2007 | Mitchell | ............. G06F 11/3644 714/E11.207 |
| 7,338,764 | B2 * | 3/2008 | Paek | .................... C12Q 1/6837 435/283.1 |

(Continued)

FOREIGN PATENT DOCUMENTS

AU 2012203828 A1 1/2014

OTHER PUBLICATIONS

Yinghao Cai. Exploring context Information for Inter-Camera Multiple Target Tracking. Proceedings from 2014 IEEE Winter Conference, Steamboat Springs, CO, Mar. 2014; IEEE: 2014 IEEE Winter Conference, Mar. 2014; p. 761-768.

(Continued)

*Primary Examiner* — John Strege
(74) *Attorney, Agent, or Firm* — Canon U.S.A., Inc. IP Division

(57) ABSTRACT

A computer implemented method of matching a tagged target group, selected from a plurality of gallery groups in a first camera field of view, with probe groups in a second camera field of view, by determining a group context for the tagged target group, determining, in the second camera field of view, probe contexts for the respective local probe groups in the second camera field of view; matching the group context against the probe contexts to produce respective similarity scores; and identifying based upon the similarity scores, the probe group that matches the tagged target group.

11 Claims, 11 Drawing Sheets

(56) References Cited

U.S. PATENT DOCUMENTS

| | | | | |
|---|---|---|---|---|
| 7,769,767 | B2* | 8/2010 | Petersen | G06F 17/30867 707/754 |
| 8,314,215 | B2* | 11/2012 | Bogyo | C07C 271/20 534/657 |
| 8,954,452 | B2* | 2/2015 | Cao | G06F 17/30702 707/749 |
| 9,606,058 | B2* | 3/2017 | Rothberg | G01N 21/6408 |
| 9,811,683 | B2* | 11/2017 | Adams | G06F 21/6218 |
| 2009/0089288 | A1* | 4/2009 | Petersen | G06F 17/30867 |
| 2012/0027304 | A1* | 2/2012 | Brown | G06K 9/00369 382/190 |

OTHER PUBLICATIONS

Bingpeng Ma. (May 2014) Covariance descriptor based on bio-inspired features for person re-identification and face verification. pp. 379-390. Image and Vision Computing vol. 32, Issues 6-7, Jun./Jul. ISSN 0262-8856.

Guoyun Lian. (2010) Spatial-temporal consistent labeling of tracked pedestrians across non-overlapping camera views. School of Information Science and Technology. pp. 1121-1136. Sun Yat-sen University, 510006, China.

Yinghao Cai. (Sep. 2010). Matching Groups of People by Covariance Descriptor, Conference paper.

Wei-Shi Zheng. (2009). Associating Groups of People. pp. 1-11. School of EECS, Queen Mary University of London, London E1 4NS, UK.

Henry Shu. (Sep. 2013). Face-Graph Matching for Classifying Groups of People. Cornell University USA, Stanford University, USA.

Hungarian algorithm. (Jun. 14, 2015). In Wikipedia, The Free Encyclopedia. Retrieved Jun. 20, 2016, from https://en.wikipedia.org/w/index.php?title=Hungarian_algorithm&oldid=666886678.

Farenzena. Person Re-Identification by Symmetry-Driven Accumulation of Local Feature. (Apr. 14, 2010). Computer Vision and Pattern Recognition journal. from http://profs.sci.univr.it/~cristanm/Publications_files/CVPR2010_Cristani.pdf.

Rubner, Yossi. The Earth Mover's Distance as a Metric for Image Retrieval. (Nov. 2000). International Journal of Computer Vision. vol. 40, Issue 2, pp. 99-121 from https://www.cs.cmu.edu/~efros/courses/LBMV07/Papers/rubner-jcviu-00.pdf.

* cited by examiner

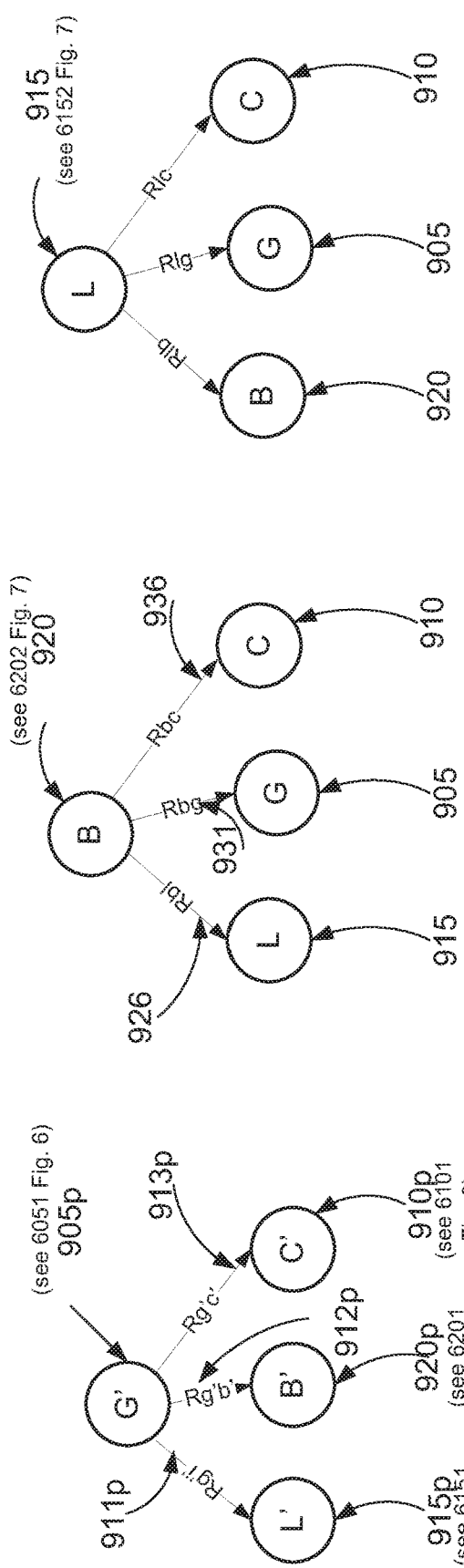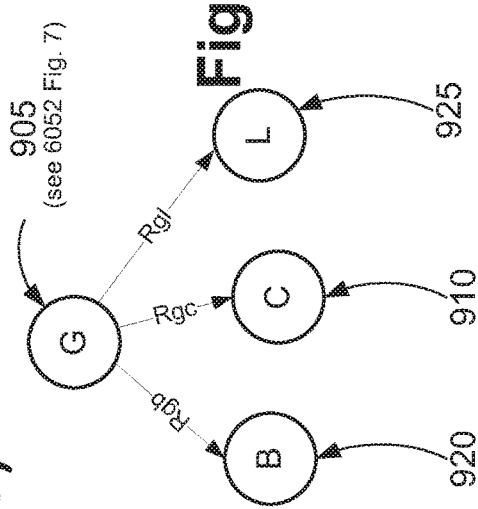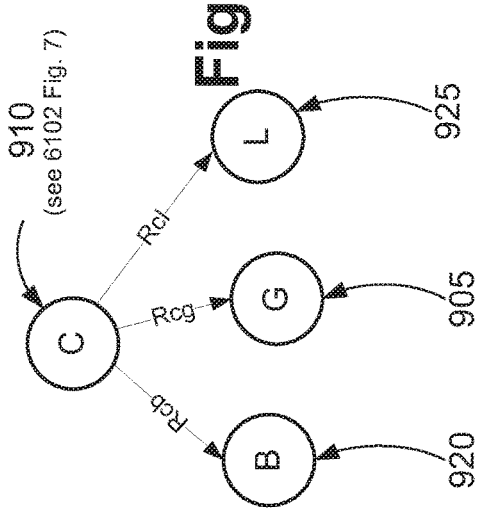
Fig. 9 (a)
Fig. 9 (b)
Fig. 9 (c)
Fig. 9 (d)
Fig. 9 (p)

SYSTEM AND METHOD FOR OBJECT MATCHING

CROSS REFERENCE TO RELATED APPLICATIONS

The present application claims the benefit of Australian Patent Application No. 2015-203591, filed Jun. 26, 2015, which is hereby incorporated by reference herein in its entirety.

TECHNICAL FIELD

The present invention relates to matching groups in visual images or video streams and, in particular, to matching groups of people across different camera views.

BACKGROUND

Public venues such as shopping centres, parking lots and train stations are increasingly subject to surveillance using large-scale networks of video cameras. Application domains of large-scale video surveillance include security, safety, traffic management and business analytics. In an example from the business analytics domain, a shopping centre may wish to track customers across multiple cameras in order to build a profile of shopping habits.

A key task in many of these applications is the performance of rapid and robust object matching across multiple camera views. In one example, also called "re-identification", object matching is used to locate a specific object of interest or specific objects of interest across multiple cameras in the network with non-overlapping fields of view.

Robust object matching is a challenging problem for several reasons. Firstly, many objects may have similar appearance, such as a crowd of commuters on public transport wearing similar business attire. Furthermore, the viewpoint (i.e. the orientation and distance of an object in the camera's field of view) can vary significantly between cameras in the network. Finally, lighting, shadows and other photometric properties including focus, contrast, brightness and white balance can vary significantly between cameras and locations. In one example, a single network may simultaneously include outdoor cameras viewing objects in bright daylight, and indoor cameras viewing objects under artificial lighting.

One approach to solving this problem is to use group matching for object re-identification. There are several approaches to group matching.

In one approach, appearance-based ratio-occurrence descriptors are used for matching group images. A Centre Rectangular Ring Ratio-Occurrence (CRRRO) defines a rectangular ring structure expanding from the centre of a group image, and Block-based ratio-occurrence (BRO) defines a block based structure where the entire image is divided into blocks. In both these cases, a colour histogram is extracted for the ring or block structure and used for comparison. CRRRO has the disadvantage that it cannot handle large non-centre-rotational changes in people's positions within a group.

In another approach, appearance-based covariance (COV) descriptors can be used for group matching. COV is a discriminative descriptor that captures both appearance and spatial properties of image regions.

Both the approaches have the disadvantage that they do not work when matching groups with similar appearance, for example where people are dressed in business suits.

Some methods adopt a Bayesian framework for consistent labelling across non-overlapping camera views. The Bayesian framework uses spatial-temporal cues (as priors) and visual appearance cues (as likelihoods) for computing a maximum-a-posteriori (MAP) estimator. In situations comprising multiple disjoint fields of view (FOVs), for a new detected object in one FOV, the Bayesian framework formulates a hypothesis space in another earlier FOV and assigns a higher prior to the objects composing a hypothesis if they enter the later FOV at the same time and a lower prior if they enter at different times. This approach has the disadvantage that the formulated hypothesis space is not scalable as it is likely to become very large and cause a very large computational overhead. In addition, this method relies more on low-level visual appearance cues.

In another approach, combining biometric cues such as gait and spatio-temporal cues such as velocity and position is used. This approach uses a graph to model people and their relationships in an input video stream. Each person is modelled as a node in the graph and there is an edge connecting two persons if they are spatially close to each other. The identity of each person is then propagated to their connected neighbours in the form of message passing in a graph via belief propagation. The message passed depends on a local evidence term capturing the biometric cue such as face or gait, and a compatibility term describing the spatio-temporal cue. This approach is complicated and inefficient, since it performs message passing on the underlying graph model.

In another method, for each track, an appearance context score is determined by summing weighted appearance similarity scores with its neighbours. Weights are determined by the closeness of the track's end times. To match between tracks of objects, an inter-object similarity score for two tracks in different views is obtained by subtracting the corresponding appearance context scores. The final appearance affinity score between the tracks is obtained by adding the inter-object similarity score and appearance similarity score. This approach relies heavily relies on low-level appearance which is not robust for identifying people with similar appearances in a view, or where appearance changes across views (e.g. caused by viewpoint and illumination changes). Also, this approach does not work well in the situation where neighbours change.

SUMMARY

It is an object of the present invention to substantially overcome, or at least ameliorate, one or more disadvantages of existing arrangements.

Disclosed are arrangements, referred to as Context Based Comparison (CBC) arrangements in this specification, which seek to address the above problems by matching attributes and relationships of a tagged target group in a first camera field of view against attributes and relationships of (candidate) groups in a second camera field of view, in order to identify the tagged target group in the second camera field of view.

According to a first aspect of the present invention, there is provided a computer implemented method of matching a tagged target group, selected from a plurality of gallery groups in a first camera field of view, with probe groups in a second camera field of view, the method comprising the steps of:

determining, by the computer, a group context for the tagged target group;

determining, by the computer, in the second camera field of view, probe contexts for the respective probe groups in the second camera field of view;

matching, by the computer, the group context against the probe contexts to produce respective similarity scores; and identifying, by the computer, based upon the similarity scores, the probe group that matches the tagged target group.

Preferably, the step of determining a group context for the tagged target group comprises determining, in the second camera field of view, a predicted group context for the tagged target group.

Preferably, the group context and the probe context are dissimilarity contexts.

Optionally, the method further comprises the steps of:
  determining appearance models for the tagged target group and the probe groups;
  matching the appearance model of the tagged target group against the appearance models of the probe groups to produce respective intra-group similarity distance scores; and
  identifying the probe group that matches the tagged target group based upon the intra-group similarity scores.

Optionally, the appearance model for the tagged target group is determined based upon the tagged target group in the field of view of the first camera.

Optionally, at least one of the predicted group context and the probe context are determined based upon filter criteria.

According to another aspect of the invention, there is provided an apparatus for matching a tagged target group, selected from a plurality of gallery groups in a first camera field of view, with probe groups in a second camera field of view, the apparatus comprising:
  a memory storing a computer executable program; and
  a processor for executing the program to perform a method comprising the steps of:
    determining a group context for the tagged target group;
    determining in the second camera field of view, probe contexts for the respective probe groups in the second camera field of view;
    matching, by the computer, the group context against the probe contexts to produce respective similarity scores; and
    identifying, by the computer, based upon the similarity scores, the probe group that matches the tagged target group.

According to another aspect of the invention, there is provided a computer readable non-transitory storage medium storing a computer executable program for directing a processor to perform, in an apparatus for matching a tagged target group selected from a plurality of gallery groups in a first camera field of view with probe groups in a second camera field of view, a method comprising the steps of:
  determining a group context for the tagged target group;
  determining in the second camera field of view, probe contexts for the respective probe groups in the second camera field of view;
  matching, by the computer, the group context against the probe contexts to produce respective similarity scores; and
  identifying, by the computer, based upon the similarity scores, the probe group that matches the tagged target group.

Other aspects of the invention are also disclosed.

BRIEF DESCRIPTION OF THE DRAWINGS

One or more embodiments of the invention will now be described with reference to the following drawings, in which:

FIG. 9, which includes FIGS. 9(*a*)-9(*d*) and FIG. 9(*p*), provides an illustration of a CBC arrangement, depicting a star graph representation to depict the predicted context for tagged target and the star graph representation for each of the probe groups.

DETAILED DESCRIPTION INCLUDING BEST MODE

Figure 1:
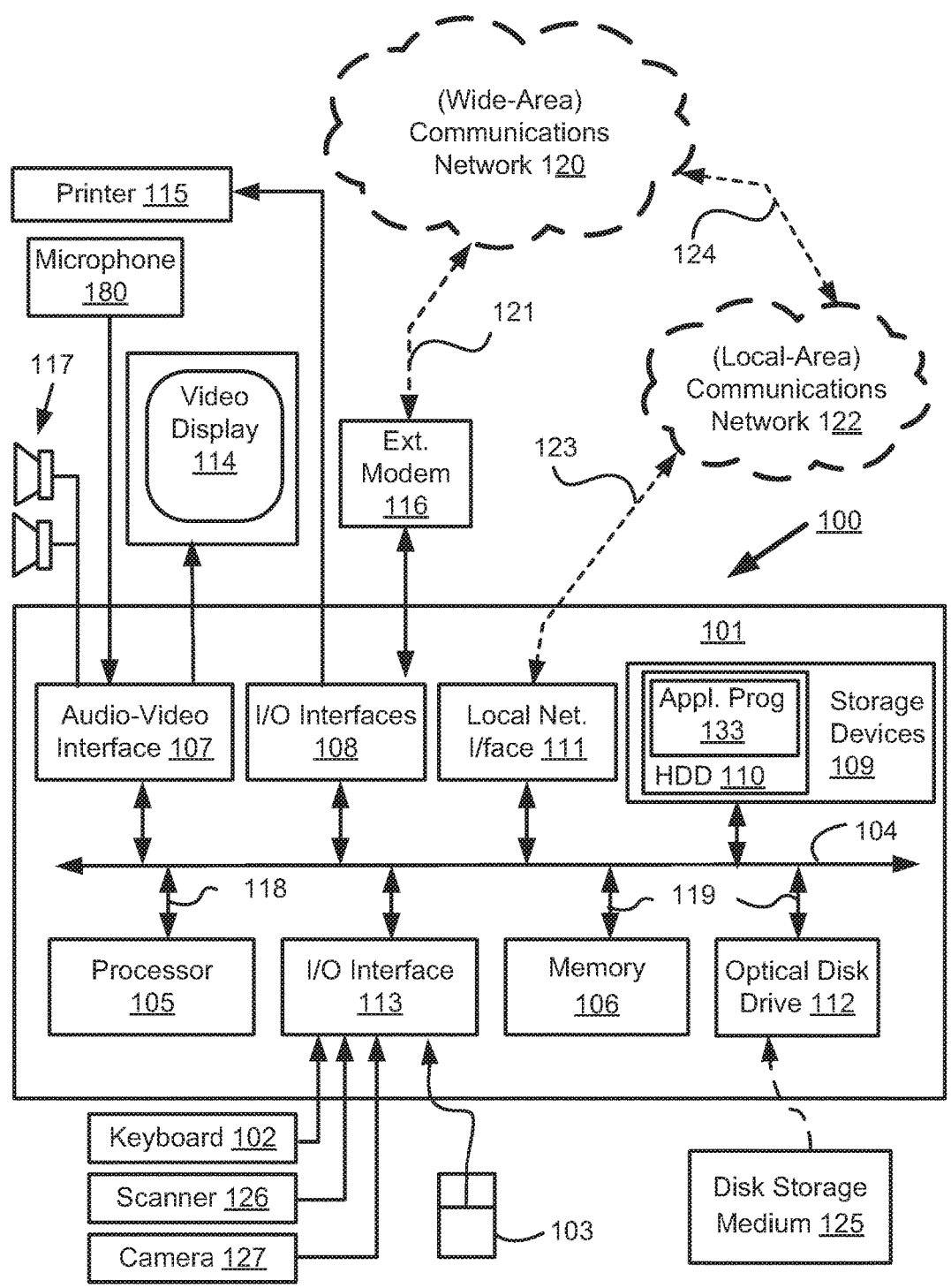
FIGS. 1 and 2 form a schematic block diagram of a general purpose computer system upon which the CBC arrangements can be implemented.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of arrangements which may form public knowledge through their use. Such discussions should not be interpreted as a representation by the inventors or the patent applicant(s) that such arrangements in any way form part of the common general knowledge in the art.

The following terms, in bold italic format, are defined in this specification as indicated, unless explicitly defined differently.

*context*: representation of relationships between attributes of groups in a scene, as may be represented by a star graph or as a vector.

*destination group*: a group at the arrow end of a directed edge;

*dissimilarity*: representation of a difference relationship between two groups in a star graph (this may be represented by an edge in a star graph);

*dissimilarity context*; a context in which the edges represent the differences between the group attributes (also referred to simply as a context unless otherwise specified);

*edge*; represents relationships between two groups in a star graph (eg an edge may represent the dissimilarity between the attributes of the two groups);

*entry time*: the time a group enters the field of view (FOV) of a camera;

*exit time*: the time a group leaves the FOV of a camera;

*gallery group*: a group in the gallery view;

*gallery view*: a video stream from the FOV of a first camera;

group attributes: attributes of a group (such as [V, P, X] where V is the velocity of the group, P is the position of the group and X is the exit time of the group);

inter-group dissimilarity matching: a process of matching (i) each local probe dissimilarity context in the probe view and (ii) the predicted target group dissimilarity context in the probe view, or target group dissimilarity context in the gallery view, to produce a set of similarity scores;

local probe context: the context for a probe group;

node: represents attributes of a group in a star graph;

vector-context: Is the vector representation of a context. It is a vector which incorporates all the relationship attributes (eg all the edges) in the star graph, such as [Rgl Rgc Rgb], where Rgl is [$V_{05}$-$V_{15}$, $P_{05}$-$P_{15}$, $X_{05}$-$X_{15}$] etc;

predicted context: representation of the relationships between the attributes of a gallery group in the probe view;

predicted group: an image of a gallery group (as depicted in the gallery view) or predicted image of the gallery group in the probe view together with the predicted spatio-temporal attributes for the gallery group in the probe view;

probe group: a group in the probe view;

probe view: a video stream from the FOV of a second camera;

relationship attributes: attributes that represent a relationship between groups, for example a directed edge (ie a vector) in a star graph such as [$V_{15}$-$V_{05}$, $P_{15}$-$P_{05}$, $X_{15}$-$X_{05}$];

similarity score: a measure of how closely a particular local probe context matches the predicted target group context;

source group: a group at the opposite end of the directed edge from the arrow;

spatio-temporal attributes: attributes which relate to space and time, such as position, entry and exit time;

star graph: a representation of a context in which nodes represent attributes of groups, and edges represent relationships between the groups;

tagged target group: a gallery group to be identified in the probe view;

The present disclosure is directed towards providing a technique of group matching across different camera views as a means of group re-identification. The CBC arrangements involve determining the similarity between contexts (eg see a step 380 in FIG. 3). This specification describes the determination of similarity where the contexts in question are dissimilarity contexts, ie where the directed edges in the star graphs representing the context represent the differences between the group attributes. However, the CBC arrangements are not limited to edges of this form. The contexts referred to in this specification are thus dissimilarity context unless otherwise specified.

The disclosed CBC arrangements help to match groups across different overlapping or non-overlapping camera fields of view. A group consists of one of more people or objects such as cars. A group may be a social group like family or friends, or an accidental group which is formed dynamically based upon attributes such as spatio-temporal attributes.

Figure 6:
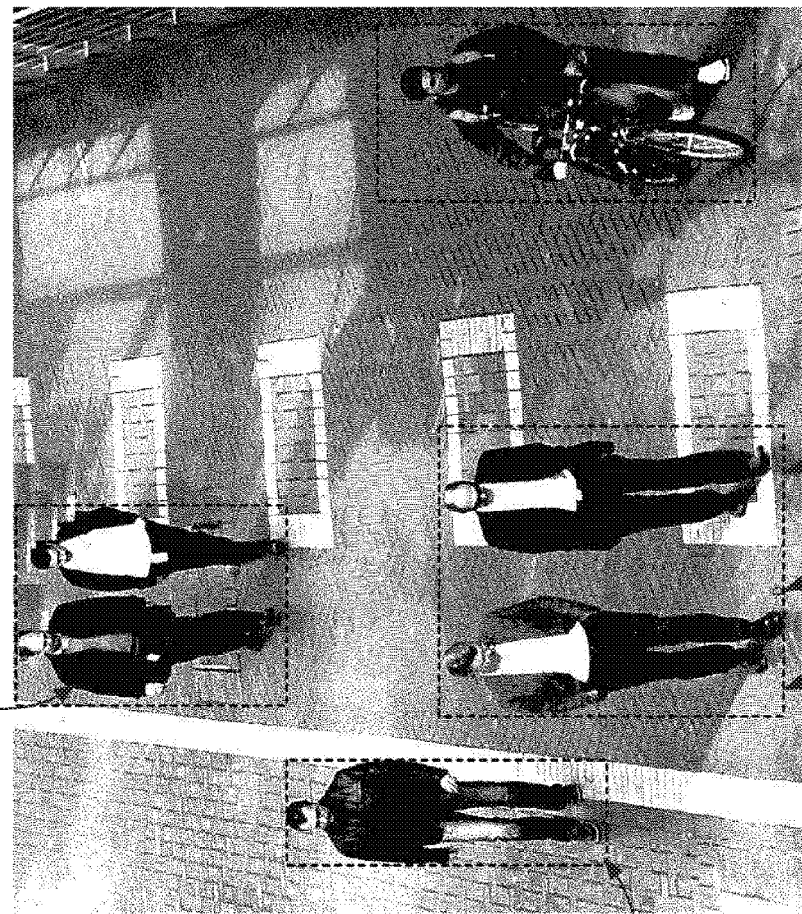
FIG. 6 provides an illustration of a CBC arrangement, showing an example of a frame streamed from camera 1.

Spatio-temporal attributes are attributes which relate to space and time, such as position, entry and exit time. A position (such as 6251) of a group (such as 6051) can, in one CBC arrangement, be defined as the ground plane co-ordinates of a midpoint of a lower edge of a bounding box for the group in question, where the bounding box is a 2-D rectangle (such as 6241) around the group members as illustrated in FIG. 6. An entry time is the time a group enters the field of view of a camera. An exit time is the time a group leaves the field of view of a camera.

Let us consider a scenario of two non-overlapping cameras. A first video stream obtained from the first camera is referred to as the gallery view. The gallery view is made up of one or more frames of the first video stream. Groups in the gallery view are referred to as gallery groups. A second video stream obtained from the second camera is the referred to as the probe view. The probe view is made up of one or more frames of the second video stream. Groups formed in the probe view are the probe groups. A tagged target group is a gallery group (ie in the gallery view) which is designated as needing to be identified in the probe view. There may be one or more tagged target groups. The tagged target group may be pre-defined, or may be selected using a user interface such as the keyboard 102, or may be identified by using a description such as the group with "two people wearing white shirts".

The term context is defined as the relationship between the attributes of the groups in a scene.

In one CBC implementation, all the groups in the scene are considered when defining context.

In another CBC implementation, a filtered neighbourhood, in which only certain groups are considered as the basis for defining context, based on filtering criteria such as their relationship to the tagged target group, their behaviour or their position in the scene. For example, groups that are close to the tagged target group may be considered as a filtered neighbourhood and groups at the periphery of the scene may not be considered.

Context is similar to a higher space which defines all the different types of relationships between group attributes in a scene.

Examples of attributes are spatio-temporal attributes such as velocity, position, entry time, exit time, distance, appearance attributes such as appearance colour features or Histogram of Oriented Gradients (HOG) features. The velocity of a group is obtained by tracking the position of a group over time. For example, the group attributes of a node 1110 which represents the group 6051 (see FIG. 11) are [$V_{05}$, $P_{05}$, $X_{05}$] where $V_{05}$ is the velocity of the group, $P_{05}$ is the position of the group and $X_{05}$ is the exit time of the group.

In one CBC implementation, the context of a group is represented as a star graph (described hereinafter in more detail with reference to FIG. 11) where nodes represent attributes of groups, and edges represent relationships between the groups. Attributes of the group may be spatio-temporal attributes or appearance attributes. The attributes of the groups are called group attributes. The edges, which represent the relationship between the groups, in one CBC implementation may be the difference (also referred to as dissimilarity) between the attributes. A context in which the edges are the difference (ie the dissimilarity) between the group attributes is referred to as a dissimilarity context. Attributes that represent the relationship between the groups are called relationship attributes.

Figure 11:
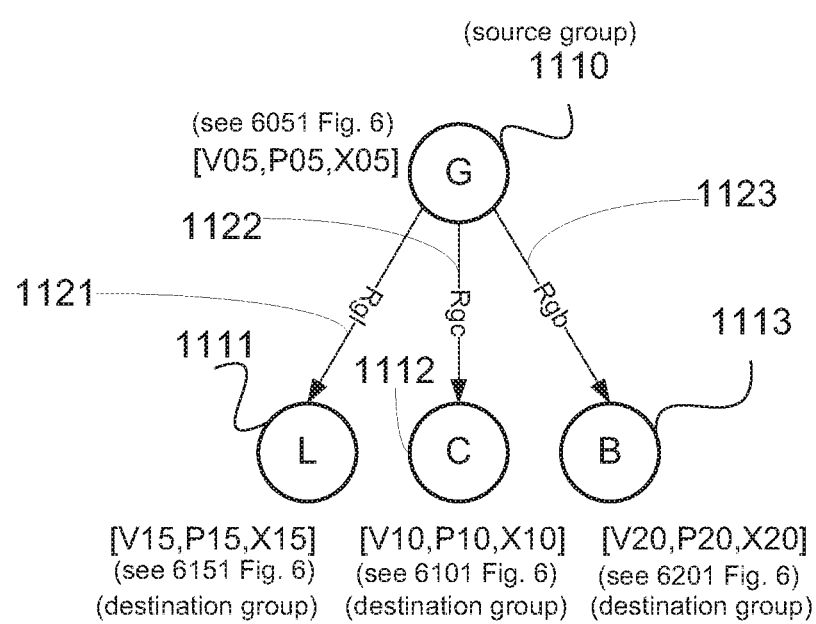
FIG. 11 is an example of a context which is represented as a star graph for the scene in FIG. 6.

FIG. 11 is an example of a context which is represented as a star graph for the scene in FIG. 6.

In FIG. 11, the groups 6201, 6151, 6051 and 6101 have respective group attributes [$V_{20}$, $P_{20}$, $X_{20}$], [$V_{15}$, $P_{15}$, $X_{15}$], [$V_{05}$, $P_{05}$, $X_{05}$], [$V_{10}$, $P_{10}$, $X_{10}$] where V is the velocity of the corresponding group, P is the position of the corresponding group and X is the exit time of the corresponding group. In the star graph shown in FIG. 11 the group 6051 is represented by a node 1110 (ie G). Similarly 6151 is represented by a node 1111 (ie L), 6101 is represented by a node 1112 (ie C) and 6201 is represented by a node 1113 (ie B). Each node has respective group attributes. For example, the node 1110 has the attributes for group 6051 which are [$V_{05}$, $P_{05}$, $X_{05}$].

Edges represent relationship between the groups. In some CBC implementations, edges can be directed edges. For example, an edge Rgl (ie 1121) represents the relationship between the groups G and L. In one CBC implementation, an edge represents the dissimilarity between the attributes of the respective groups. For example, taking the difference between the attributes of the groups, in one CBC implementation gives the dissimilarity between the groups. For example Rgl (ie 1121) is a vector (ie a directed edge) with attribute value [$V_{15}$-$V_{05}$, $P_{15}$-$P_{05}$, $X_{15}$-$X_{05}$]. If the edge is a directed edge, it represents destination group (ie the group at the arrow end of the directed edge) attributes minus the source group (ie the group at the opposite end of the directed edge from the arrow) attributes. For example the relationship Rgl has relationship attributes which are the group L attributes minus group G attributes. Similarly, Rgc (ie 1122) gives the relationship between groups G and C and Rgb (ie 1123) gives the relationship between groups G and B.

The context in one example is represented as a vector which incorporates all the relationship attributes in the star graph. For example, O is the vector-context (vector representation of context) for FIG. 11 and can be expressed as follows:

$$O=[Rgl\ Rgc\ Rgb]$$

where Rgl is [$V_{15}$-$V_{05}$, $P_{15}$-$P_{05}$, $X_{15}$-$X_{05}$], Rgc is [$V_{10}$-$V_{05}$, $P_{10}$-$P_{05}$, $X_{10}$-$X_{05}$] and Rgb is [$V_{20}$-$V_{05}$, $P_{20}$-$P_{05}$, $X_{20}$-$X_{05}$]. The vector representation of the context is a vector-context.

The context, which in one example is referred to as the dissimilarity of attributes of groups in a scene, can be regarded as a signature of the groups in question.

It is noted that O as described above is the vector-context depicted in FIG. 11 with the node G designated as the source group, and the nodes L, C and B designated as destination groups.

Inter-Group Matching

As described hereinafter in more detail with reference to FIGS. 3-11, FIGS. 1 and 2 depict a general-purpose computer system 100, upon which the various CBC arrangements described can be practiced.

As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

Figure 2:
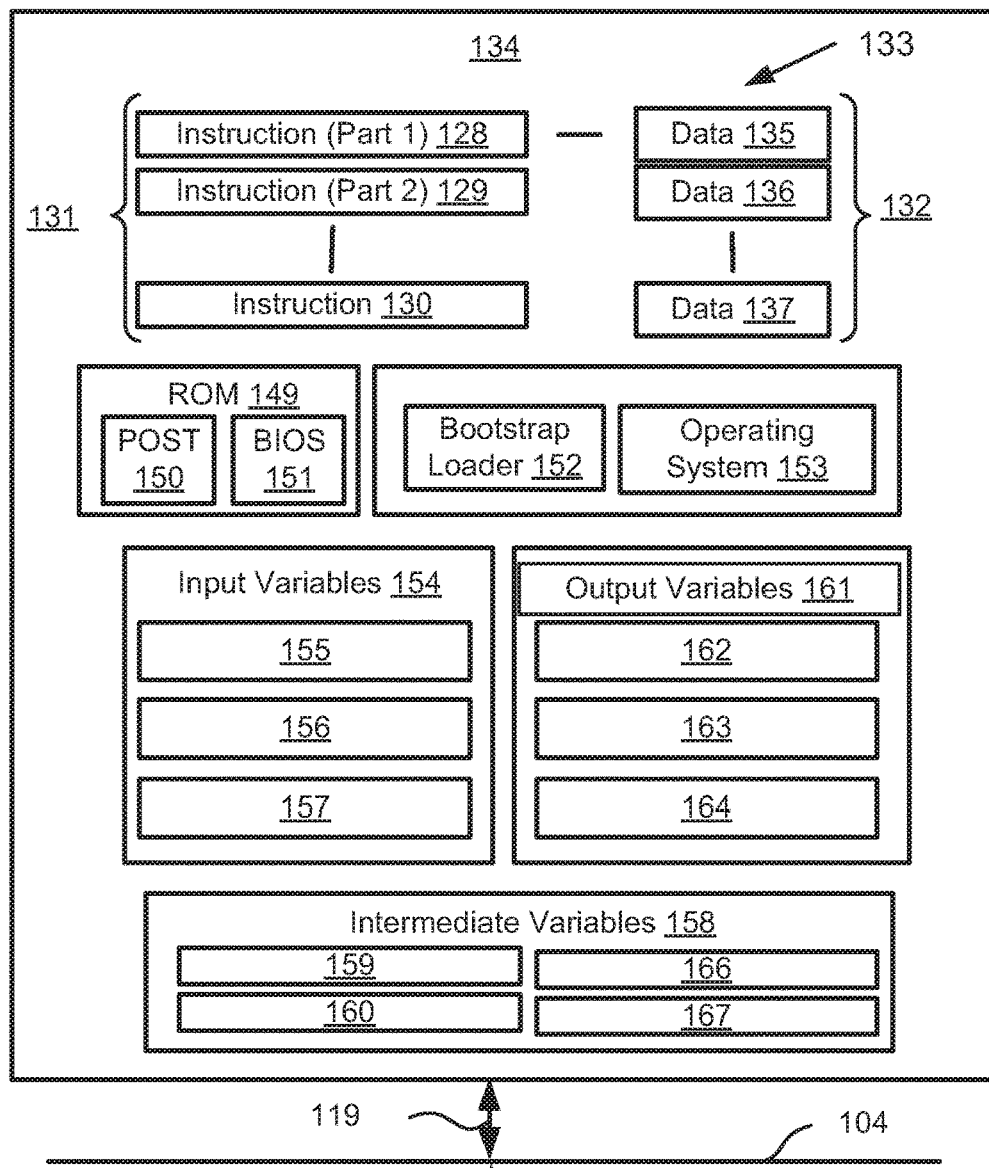
Figure 2:
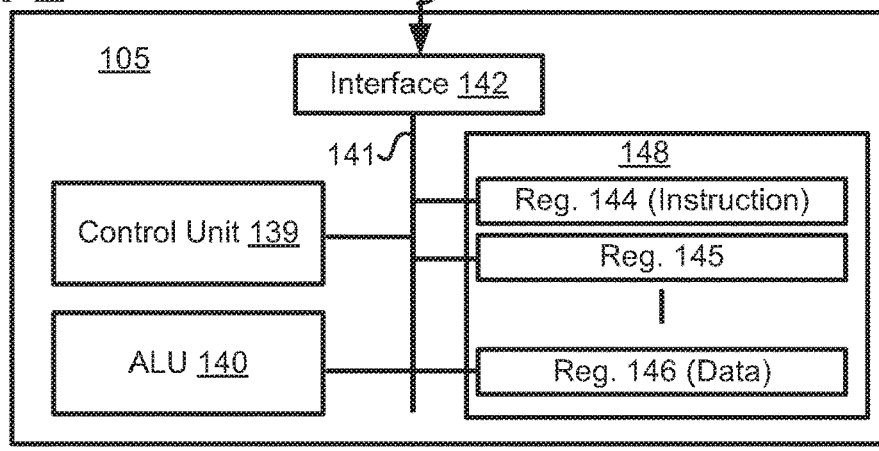
Figure 3:
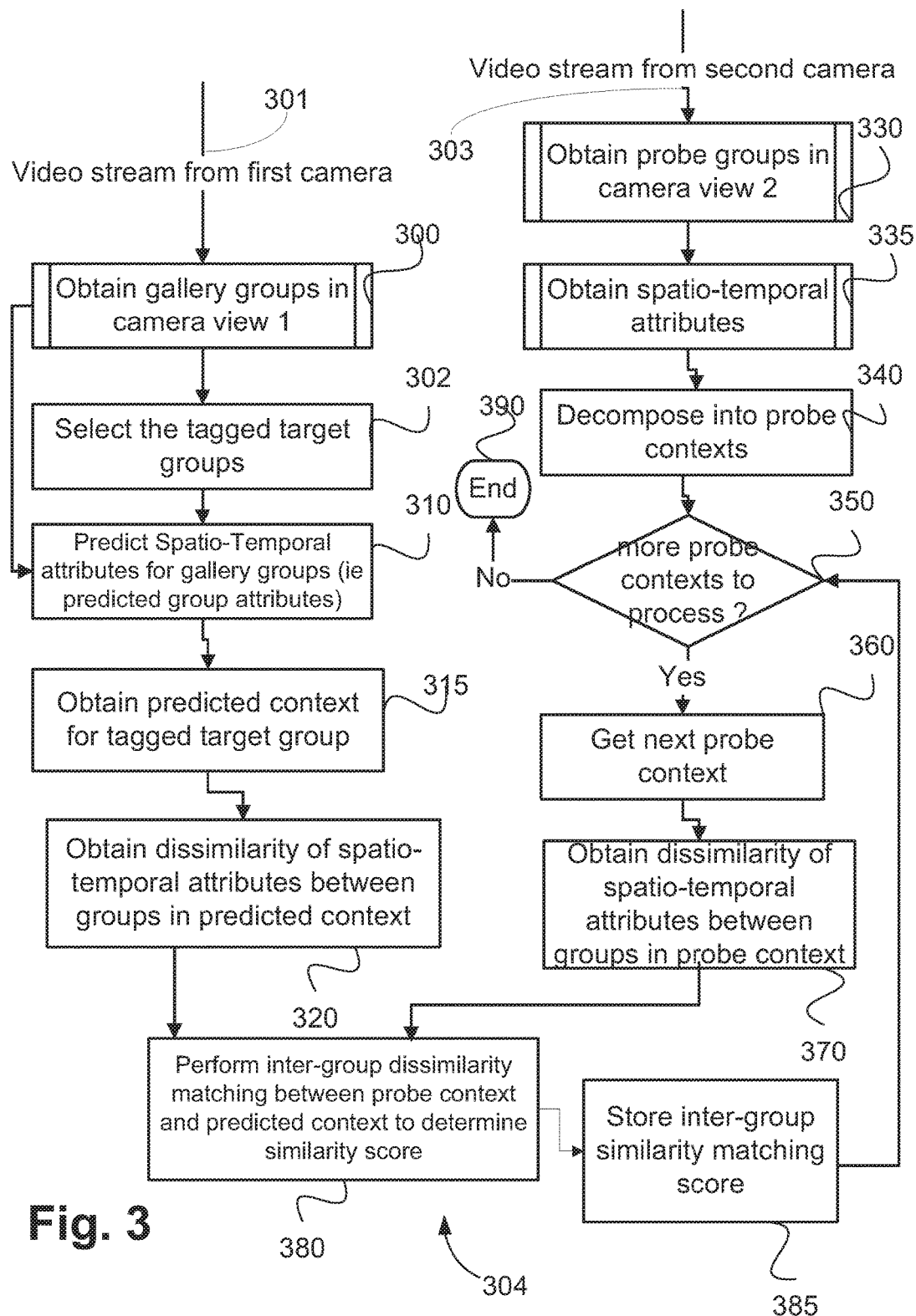
FIG. 3 is a flow diagram illustrating a CBC inter-group matching process.
Figure 4:
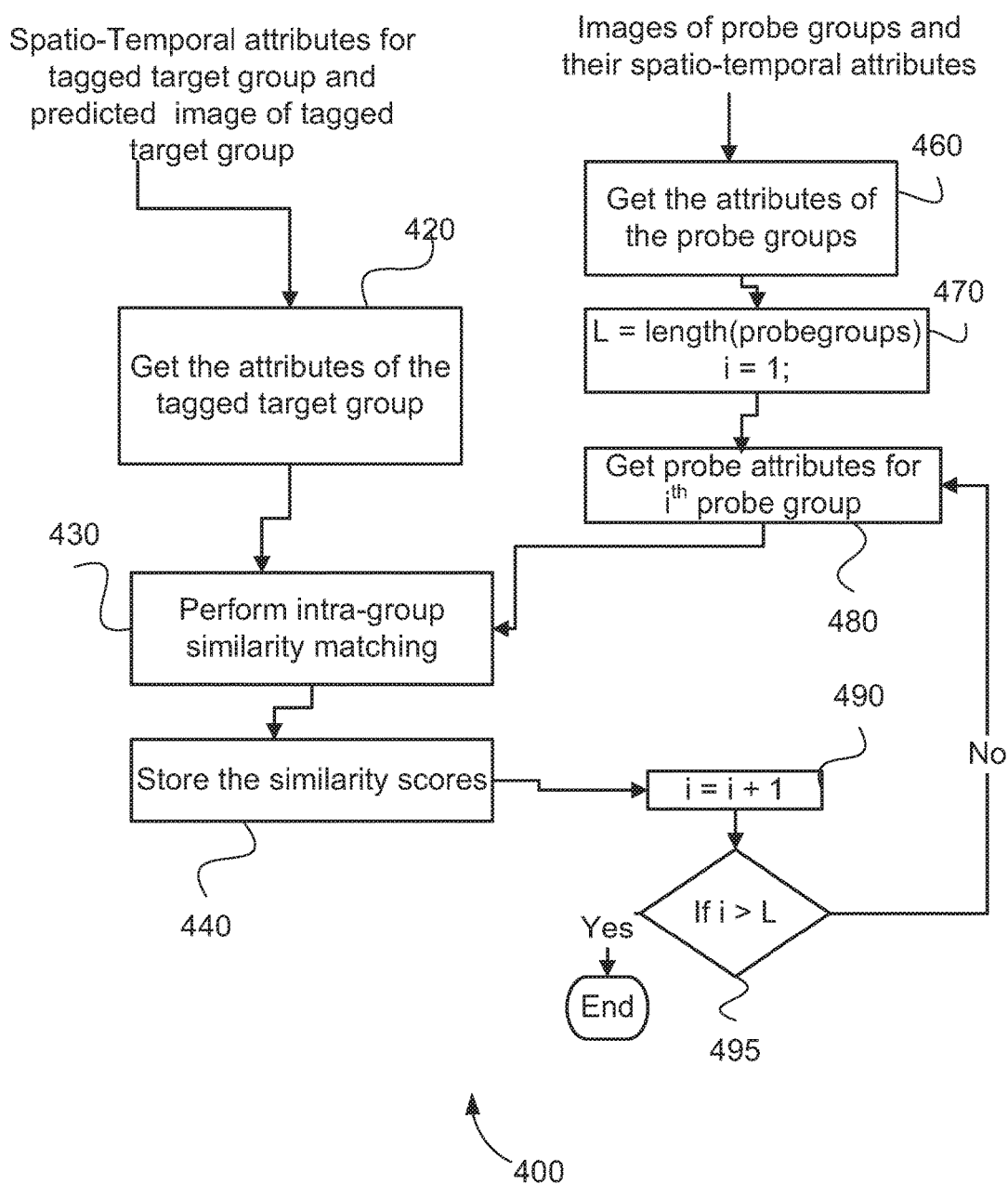
FIG. 4 is a flow diagram illustrating a CBC intra-group matching process.
Figure 5:
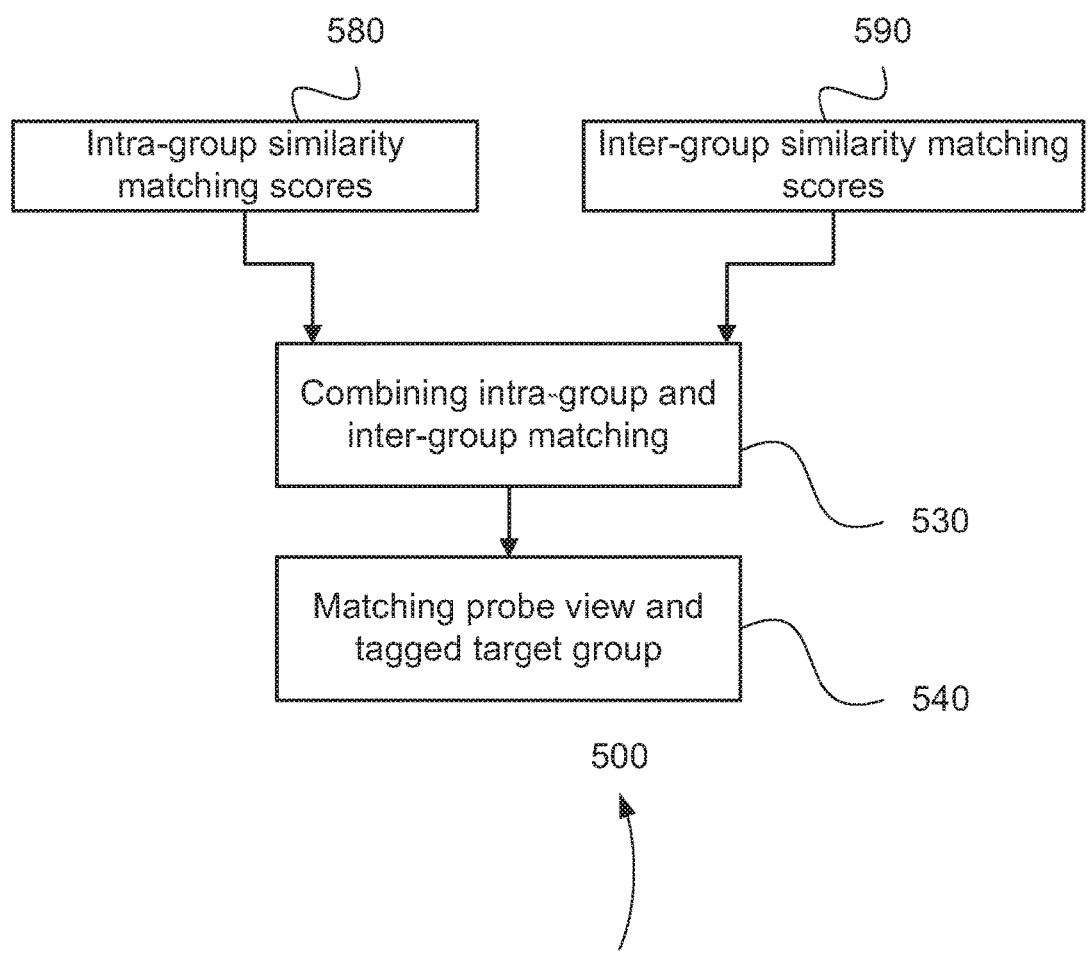
FIG. 5 is a the flow diagram which illustrates the process of combining intra-group matching with inter-group matching in a CBC arrangement.

The CBC arrangements may be implemented using the computer system 100 wherein the processes of FIGS. 3-5, to be described, may be implemented as one or more software application programs 133 executable within the computer system 100. In particular, the steps of the CBC method are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the CBC methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous CBC apparatus.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects a CBC apparatus.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed CBC arrangements use input variables 154, which are stored in the memory 134 in corresponding memory locations 155, 156, 157. The CBC arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3-5 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The CBC methods may alternatively be implemented in dedicated hardware such as one or more integrated circuits performing the CBC functions or sub functions. Such dedicated hardware may include graphic processors, digital signal processors, or one or more microprocessors and associated memories.

FIG. 3 shows a flow diagram illustrating a CBC intergroup matching process 304 performed by the processor 105 executing the CBC software 133 in order to match probe groups in the second camera view (probe view) with a tagged target group in the first camera view (gallery view). The inputs to the process 304 are low or high resolution images of a JPEG first video stream 301 from the first camera, and also low or high resolution images of the JPEG second video stream 303 from the second camera.

The JPEG images from the first video stream 301 of the first camera are passed as input to a step 300 and JPEG images from the second video stream 303 of the second camera are passed as input to a step 330. The steps 300 and 330 process the JPEG images to respectively form gallery groups of people (eg 6201, 6151, 6051, and 6101) in the first camera field of view and probe groups of people (eg 6202, 6152, 6052 and 6102) in the second camera field of view.

In one CBC implementation, groups may be pre-defined social groups who may be registered in the CBC system. For example, a family groups and a friends group may indicate beforehand that they are each one group, and consequently when they appear in the camera views they are automatically defined as a group. In another CBC implementation, accidental groups may be formed by considering the proximity of people or objects. For example, people or cars that satisfy a Euclidean distance threshold such as 20 pixels may be grouped together. Furthermore, people or vehicles that move with a similar velocity, such as 5 kms/hr, may be grouped together. In addition, people or objects that move in the same direction, such as travelling North, may be grouped together. In another CBC implementation, people or objects which meet all the combinations of criteria such as direction, velocity and proximity may be grouped together.

All groups formed by the steps 300, 330 are assigned group identifier by the steps 300, 330, for example a numeric number such as 1.

Considering the gallery view, from the step 300, control then passes to a step 302. One or more tagged target group(s) are selected at this step. In one CBC implementation, the tagged target group(s) may be identified by control signal(s) from the user via a user interface such as the keyboard 102, by means of which the user selects one or more groups of interest by entering the group identifier such as number 2, or a description of the group such as "group with 2 people with white shirts". The user may also use the mouse 103 to point to the groups of interest in the gallery view that need to be identified in the probe view. The selected tagged target group identifiers from the step 302, the image of the tagged target group(s) and the gallery groups and their attributes such as their appearance and spatio-temporal attributes from step 300 are passed to a following step 310.

Figure 8:
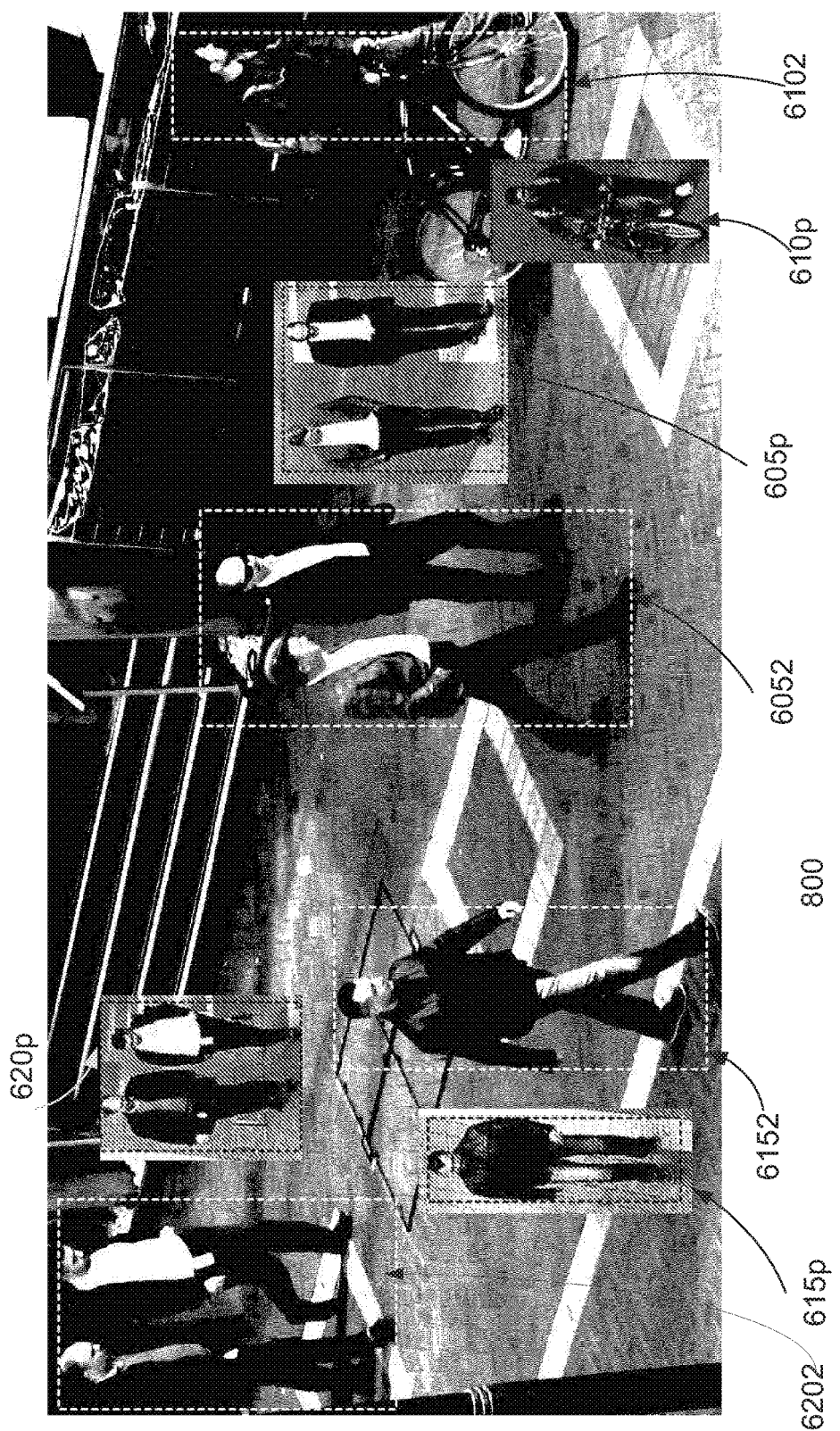
FIG. 8 provides an illustration of a CBC arrangement, showing an example of the frame streamed from camera 2 along with predictions of camera 1.

The step 310 predicts spatio-temporal attributes for gallery groups such as 6201, in the second camera field of view, as depicted by 620$p$ in FIG. 8. The gallery groups are groups identified in the first camera field of view as depicted in FIG. 6.

FIG. 8 shows an image 620$p$ in the second camera FOV, where 620$p$ is the predicted group associated with the gallery group 6201 in the first camera FOV. The predicted group 620$p$ in FIG. 8 is the predicted image together with the predicted spatio-temporal attributes for the gallery group 6201.

The prediction determines the spatio-temporal attributes of all the gallery groups in the second or probe camera field of view. Prediction is based on the spatio-temporal attributes of the gallery groups in the first camera field of view, the topology of the cameras and the distance between the cameras. Spatio-temporal attributes are attributes which relate to space and time parameters such as position, entry and exit time. An Entry time is the time a group enters the field of view of the camera in question. The entry time can be expressed as a frame number such as 1278, or as a time such as 12:20:01 (hh:mm:ss). An exit time is the time a group leaves the field of view of the camera in question.

In one CBC implementation, the prediction of the entry time of each of the gallery groups into the field of view of the $2^{nd}$ camera (ie the probe view) is performed by considering the exit time of the group in question from the gallery FOV, the velocity of the group and the distance between the cameras using the following formula:

predicted_entry_time_$c2$=exit_time_$c1$+distance/ velocity

Prediction of the position of a group is performed by considering the x (x1) and y (y1) positions of the group in the last frame of the first camera FOV when the group exits the first camera FOV and the topology of the second camera and its FOV. If for example the topology of the cameras indicates that the cameras are in a straight line (in the x direction) and that people are walking in the y direction, then the x (x1) position of a group in the first camera FOV will be the x (x2) position of the group in the second camera FOV, the being expressed as follows:

x2=x1:–x positions of the two groups across cameras is the same and the y position of the group in the second camera FOV y2 is expressed as follows:

y2=y1+distance_between_cameras:–translated y value based on the distance between the cameras In another CBC implementation, in order to predict the velocity and position of a group from the first FOV in the second FOV, a training dataset is used. In one CBC implementation, a training dataset of training groups of people moving between the cameras is captured together with their attributes. Such attributes can include training groups' velocity, x and y positions in the first camera FOV, the time at which the group exits the FOV of the first camera, and x and y positions in the second camera FOV when the group enters the FOV of the second camera. Training may be performed by using a machine learning algorithm such as Support Vector Machine (SVM). This machine learning algorithm can be applied to the training dataset, and consequently the x and y positions in the second camera FOV can be learned, given the x and y positions in the first camera FOV and the velocity of the group. This can be used in the step 310 to predict the position and the velocity of the group in the second camera FOV given the groups velocity and the position in the first camera FOV.

In another CBC implementation, the velocity at the exit time of a group in the first camera FOV may be used as the velocity of the group at the entry time of the second camera FOV.

The output of the step 310 is the predicted spatio-temporal attributes, in the second camera FOV, for each gallery group in the first camera FOV. Each of the gallery groups (ie their images) together with their predicted attributes, is referred to as a predicted group. For example, the image(s) of the tagged target group together with the predicted attributes, in the second camera FOV, is referred to as the predicted tagged target group.

Control then passes to a step 315. This step determines the context of the predicted tagged target group. In one example, the step 315 represents the context of the predicted tagged target group as a context star graph, previously described with reference to FIG. 11, in which the tagged target group is the source group, and the other gallery groups are the destination groups.

It is noted that the attributes of the predicted groups can include the spatio-temporal attributes of the predicted groups and may also include the appearance attributes of the predicted groups. The context star graph FIG. 11 utilizes nodes to represent groups and uses edges to represent relationships between the groups. The output of the step 315 is the output of the predicted context. In one CBC arrangement, this is a vector-context, which is a vector of the relationship attributes between the different groups. The vector incorporates all the relationship attributes in the star graph. For example for FIG. 11 the vector-context can be expressed as [Rgl Rgc Rgb] where Rgl is [$V_{15}$-$V_{05}$, $P_{15}$-$P_{05}$, $X_{15}$-$X_{05}$], Rgc is [$V_{10}$-$V_{05}$, $P_{10}$-$P_{05}$, $X_{10}$-$X_{05}$] and Rgb is [$V_{20}$-$V_{05}$, $P_{20}$-$P_{05}$, $X_{20}$-$X_{05}$].

Control then passes to a step 320. This step may firstly determine a subset of the relationship attributes in the predicted context, depending on the scene. For example, if the scene has many groups with similar appearances, then spatio-temporal attributes are considered. Otherwise, other attributes such as appearance or the number of people in groups are considered.

The step 320 then determines spatio-temporal dissimilarity attributes (or other dissimilarity attributes depending upon the attributes being considered) which describe the dissimilarity between the tagged target group (as the source group) in the predicted context, and each of the other gallery groups (as destination groups) in the predicted context. The output of the step 320 is the relationship attributes which describe the spatio-temporal attributes between the tagged target group, and the other gallery groups in the predicted context. It is noted that the output of the step 315 can include attributes such as spatio-temporal, appearance etc. The output of the step 320 however is considering only a subset of attributes, in this case only spatio-temporal.

In one CBC implementation, relationship attributes can be defined as a vector of attributes (also referred to as an attribute vector) such as [v, e, x, p] where v is the velocity, e entry time, x is the exit time, and p is the position of the group.

Control then passes to a step 380.

Turning to the processing in the probe view, the input to the step 330 is the video stream from the second camera. In the step 330, groups of people are formed in the probe view in a manner similar to that performed by the step 300 in the gallery view. The output of this step is a group identifier for each group of people, spatio-temporal attributes for the group such as positions, velocity, entry time, other attributes for the group such as number of people in the group, appearance attributes for the group such as appearance feature vectors using colour, gradients. Control then passes to a step 340.

The step 340 decomposes the probe groups into probe contexts. If the number of probe groups is n, then there are 'n' probe contexts, each referred to as a local probe context. Each of the n local probe contexts has a different central node (being the source node for the local probe context in question) and (n−1) other nodes (being the destination nodes for the local probe context in question).

Each local probe context defines the relationships between the groups. The attributes that define the relationship are the relationship attribute. Each local probe context is defined in the same manner as that performed in the step 315, however where the step 315 produces one predicted context for the tagged target group, the step 340 produces n contexts, one for each of the n probe groups that are present in the second camera FOV.

In one CBC implementation, a local probe context is represented by a star graph (see FIG. 11) where the central (ie source) node is a probe group, and the other nodes are neighbouring nodes in the frame, or in a plurality of frames near the group which is defined as a central node.

Control then flows to step 350. This step determines if there are more probe contexts to process. If this is the case, control follows a YES arrow and control flows to a step 360. The step 360 gets the next probe context to process from the set of probe contexts which is the output of the step 340. Control then flows to a step 370, which is similar to the step 320. The step 370 determines spatio-temporal dissimilarities for the n local probe contexts constructed in the step 340.

Control then flows to a step 380 which performs inter-group dissimilarity matching between each of the n local probe contexts determined by the step 340, and the predicted target group context determined by the step 320. Each dissimilarity matching process produces a similarity score, In one CBC implementation, the relationship attributes of the predicted tagged target context which are represented by the edges of the predicted context graph are matched against the relationship attributes of the local probe contexts which are represented by the edges of the local probe context graph by using the Hungarian algorithm, which provides optimal assignment (see http://en.wikipedia.org/wiki/Hungarian_algorithm the contents of which are incorporated herein by reference). The Hungarian algorithm provides the best partial match of the edges that match the local probe context in question with the predicted tagged target context. The output of this step 380 is a set of n similarity scores, each of which is the matching score of the local probe context in question with the predicted tagged target context.

In another CBC implementation, every relationship attribute of the predicted tagged target context is compared with every relationship attribute of the local probe context in question using a distance measure such as Euclidean distance. A linear combination of the distance scores of each comparison is used as a similarity score and is used as a matching score of the local probe context in question with the predicted tagged target context.

Control then flows to a step 385 which stores n similarity matching scores obtained by matching local probe contexts with predicted tagged target context. In one CBC arrangement, the scores are stored in the 106 memory in a list. In another CBC arrangement the scores are stored in a database in the memory, as a field in a table.

Control then flows to the step 350 which determines if there are more local probe contexts to process. If there are more probe contexts, the process is repeated using the steps 360, 370, 380 and 385. At the step 350, if there are no more local probe contexts, control follows a NO arrow to a step 390, where the process 304 ends.

The CBC arrangement can terminate at this point, on the basis of the inter-group processing by the process 304. Alternately the CBC arrangement can also incorporate intra-group matching, described hereinafter in more detail with reference to FIGS. 4 and 5.

Intra-Group Matching

FIG. 4 shows a flow diagram illustrating an intra-group matching process 400 performed by the processor 105 executing the CBC software application 133. Inputs to the process 400 are the predicted images of the predicted gallery groups from the step 310, the predicted attributes of the tagged target group from the step 310, the images of the probe groups from the step 330, and the spatio-temporal attributes of the probe groups output by the step 335 in the process 304.

The input to a step 420 is the predicted attributes of the tagged target group from the step 310, and the tagged target group image from the step 302 of the process 304. The spatio-temporal features such as velocity, position, direction attributes of the predicted tagged target group obtained from the step 302, when expressed as a vector, form the spatio-temporal attributes of the tagged target group.

Further in this step, appearance attributes are obtained from the predicted tagged target group image. The appearance attributes are used to generate an appearance model. The appearance model in one CBC implementation may be generated as a histogram of features where the features may be colour features such as R, G, B, H, S, V, Y, U, V, gradient features, local binary pattern features, texture features such as gabor. The features are extracted from the pixels of the tagged target group image.

In another CBC implementation, a self-similarity feature matrix is the appearance model as described in (eg see Kernalized contextual feature: Australian Patent No. AU 2012203828 the disclosure of which is incorporated herein by reference).

In another CBC implementation, an appearance model may be developed using symmetry driven accumulation of features (eg see http://profs.sci.univr.it/~cristanm/Publications_files/CVPR2010_Cristani.pdf the description referred to being incorporated herein by reference).

In another CBC implementation, Earth Mover's distance (eg see http://link.springer.com/article/10.1023/A:1026543900054#page-1 the description referred to being incorporated herein by reference) is used for appearance model. This model provides partial matching of appearances.

The spatio-temporal attributes and the appearance model from this step are input to a subsequent step 430.

The input to a step 460 is the images of the probe groups from step 330, and their spatio-temporal attributes output from the step 335 of the process 304. The step 460 determines the attributes for each of the probe groups in a similar manner to that utilized in the step 420 for the tagged target group. The attributes are, in one CBC arrangement, stored in a hash table in the memory 106, where the attributes are stored against each of the probe groups. Control then passes to a step 470. This step initialises a variable L to a length (ie the number of groups) and the variable I is initialized to 1. Control then passes to a step 480. This step retrieves the probe attributes for the probe group from the hash table where the attributes have been stored against the probe group identifiers. The attributes may be spatio-temporal attributes which may be a vector or a matrix of appearance attributes. Control then passes to the step 430. This step performs intra-group similarity matching.

In one CBC arrangement, the appearance model of the tagged target group is matched against the appearance model of each probe group using Euclidean distance measurement between the two appearance models.

If the appearance model of the tagged target group is $A_{tg}$ and if the appearance model of the probe group is $A_p$ then the Euclidean distance between $A_{tg}$ and $A_p$ is determined to obtain an intra-group appearance similarity distance score. In another CBC implementation, Mahanobis or Bhattacharya distance is determined to obtain the intra-group appearance similarity score.

In another CBC arrangement, the spatio-temporal attributes of the tagged target group are subtracted from the spatio-temporal attributes of the probe groups to obtain a vector of intra-group spatio-temporal similarity scores.

In another CBC arrangement, the spatio-temporal and appearance attributes of the tagged target group are combined in a matrix. Similarly the spatio-temporal and appearance attributes of the probe groups are combined in a matrix. A Euclidean distance or other distance measure such as Mahanobis or Bhattacharya distance is then used to determine the similarity distance between the tagged target matrix and the probe matrix.

Control then passes to a step 440. The input to this step is the (appearance and spatio-temporal or their combination) similarity intra-group matching distance scores that are stored in an array in memory or in a database table as a record. Control then passes to a step 490. This step increments the variable counter 'i'. Control then passes to a step 495. This step checks the counter 'i' against the number of probe groups 'L'. If 'i' is less than 'L' then control passes to the step 480 where the next local probe group attributes are retrieved from the hash table. If in the step 495, 'i' is greater than 'L' then the process 400 ends.

FIG. 5 depicts a process 500 which combines the intra-group matching scores from the process 400 with the inter-group matching scores from the process 304.

The input to a first step 580 is the intra-group similarity matching scores obtained from the step 440 in the process 400. The intra-group similarity matching scores in one CBC implementation are the spatio-temporal similarity scores. In another CBC implementation the intra-group similarity matching scores are similarity appearance scores, and in yet another CBC implementation, the intra-group similarity matching scores are a combination of spatio-temporal and appearance similarity scores.

The inputs to a step 590 are the inter-group similarity matching scores obtained from the step 385 in the process 304. The inter-group similarity scores are the similarity scores that are obtained by performing inter-group dissimilarity matching between the predicted context of the tagged target group and local probe contexts for each of the probe groups.

Control then passes to a step 530. In this step the intra-group similarity scores are combined with the similarity scores of the inter-group matching. In one CBC implementation, the intra-group appearance similarity scores are multiplied with the inter-group similarity scores. In another CBC implementation, the intra-group appearance similarity scores are multiplied with the inter-group similarity scores.

In yet another CBC implementation, the intra-group appearance similarity and intra-group spatio-temporal similarity scores are added and then multiplied with the inter-group similarity scores. In another CBC implementation, the intra-group appearance, intra-group spatio-temporal and inter-group similarity scores are added.

In yet another CBC implementation, conditional weighted combining of scores is used. In this method, the intra-group appearance similarity scores and intra-group spatio-temporal similarity scores are used as a weight to the inter-group scores.

Let us consider a CBC arrangement in which the intra-group appearance similarity scores, intra-group spatio-temporal similarity scores and inter-group similarity scores are incorporated into an array. The step 530 retrieves the index of smallest score of the matching result, which indicates which group is similar to the tagged target group, from each of the arrays.

Let the three indices be as follows:
intra_group_appearance_index;
intra_group_spatio_temporal_index; and
inter_group_index.

In one CBC arrangement, if the intra_group_appearance_index is same as the inter_group_index then the intra-group appearance similarity score is used as a weight and it is multiplied with inter-group similarity score.

Alternately, if the intra_group_spatio_temporal_index is same as the inter_group_index, then the intra_group spatio_temporal similarity score is used as a weight and it is multiplied with inter-group similarity score.

However, if the intra_group_spatio_temporal_index and intra_group_appearance_index is not same as the inter_group_index matching result, then the intra-group similarity score is not combined with the inter-group similarity score.

The output of the step 530 is the combined scores of the intra-group similarity scores and inter-group similarity scores. Control then passes to a step 540.

The step 540 is a matching step, which determines the different matching scores of the probe groups against the tagged target group. Matching is determined by the combined scores from the step 530. The result with the smallest matching score is the group that matches the tagged target group.

In yet another CBC implementation, a ROC curve can be generated with the labels and scores of the matching groups. The ROC curve is used to generate a matching threshold. If the lowest matching score is above or equal to the threshold (e.g. 5), then the best matched group obtained from the step 530 is considered to be the closest match to the tagged target group. Otherwise, it is not considered to be the closest match to the tagged target group.

Alternative Embodiment for Inter-Group Matching Process 304:

In another CBC implementation of the process 304 (ie the inter-group matching process in FIG. 3) the step 310 is omitted. In this case, the predicted context of the tagged target group in the second camera FOV from the step 315 is replaced by the context of the tagged target group in the gallery view (ie the first camera FOV). In one such CBC implementation the spatio-temporal attributes of the group such as velocity, exit time, number of people in the group are used as attributes in the context of the tagged target group. The output of this step is the vector-context of the tagged target group which is a vector of the relationship attributes between the groups of a star graph.

Alternative Embodiment for Inter-Group Matching Step 310

In one case the predicted image of the predicted group 620p in the probe view is same as the gallery image of the gallery group 6201. In another CBC system, the predicted image may be predicted based on factors such as lighting conditions of the probe view. If the lighting conditions in the probe view are different to that of the gallery view, then the colour values of the pixels of the gallery image may be modified. In one case, the modification may be learnt by comparing the R,G,B pixel values in the probe view and gallery view using machine learning algorithms such as SVM.

Alternative Embodiment for Inter-Group Matching Step 320

In one CBC system, step 320 is omitted and the control passes to step 380 from step 315 in FIG. 3.

In one case, all the attributes of the predicted groups in the predicted context, such as appearance, spatio-temporal attributes are used for inter-group dissimilarity matching. In this case, in the step 340 other attributes such as appearance attributes of the probe groups in the local probe context are used along with spatio-temporal attributes. Also in the step 370, other dissimilarity attributes such as appearance along with spatio-temporal attributes of the probe contexts are passed to the step 380.

In another case where the step 320 is omitted, only spatio-temporal attributes of the groups in the predicted context in the step 310 are used for inter-group dissimilarity matching. The control from the step 315 flows to the step 380.

Illustration

FIGS. 6, 7, 8, 9, 10 and 11 provide an illustration of an embodiment of the CBC arrangement. In this illustration, we assume two PTZ cameras camera 1 and camera 2, which are spaced 10 meters apart in the same straight line (ie the x coordinates of camera 1 and camera 2 are the same). The video stream from camera 1 is the first view or the gallery view, and the video stream from camera 2 is the second view or the probe view. For both cameras, the conversion matrices (homography matrices) of the 2-D image co-ordinates to the ground plane co-ordinates are determined from camera calibration. By using the conversion, the ground plane co-ordinates of each person's foot are obtained, thus giving their 'position'. Position is a 2-D position with x and y co-ordinates represented as (x, y). By tracking the position of a person through many frames, and with the knowledge of frames per second (FPS) which in the present example is 22 FPS, a velocity of the person can be determined. By tracking the position of a person across many frames, a direction of their travel is determined. By using velocity, direction and position, groups can be formed in both the gallery (FIG. 6) and the probe (FIG. 7) camera views. People with similar velocity, direction and positions are grouped together.

Figure 7:
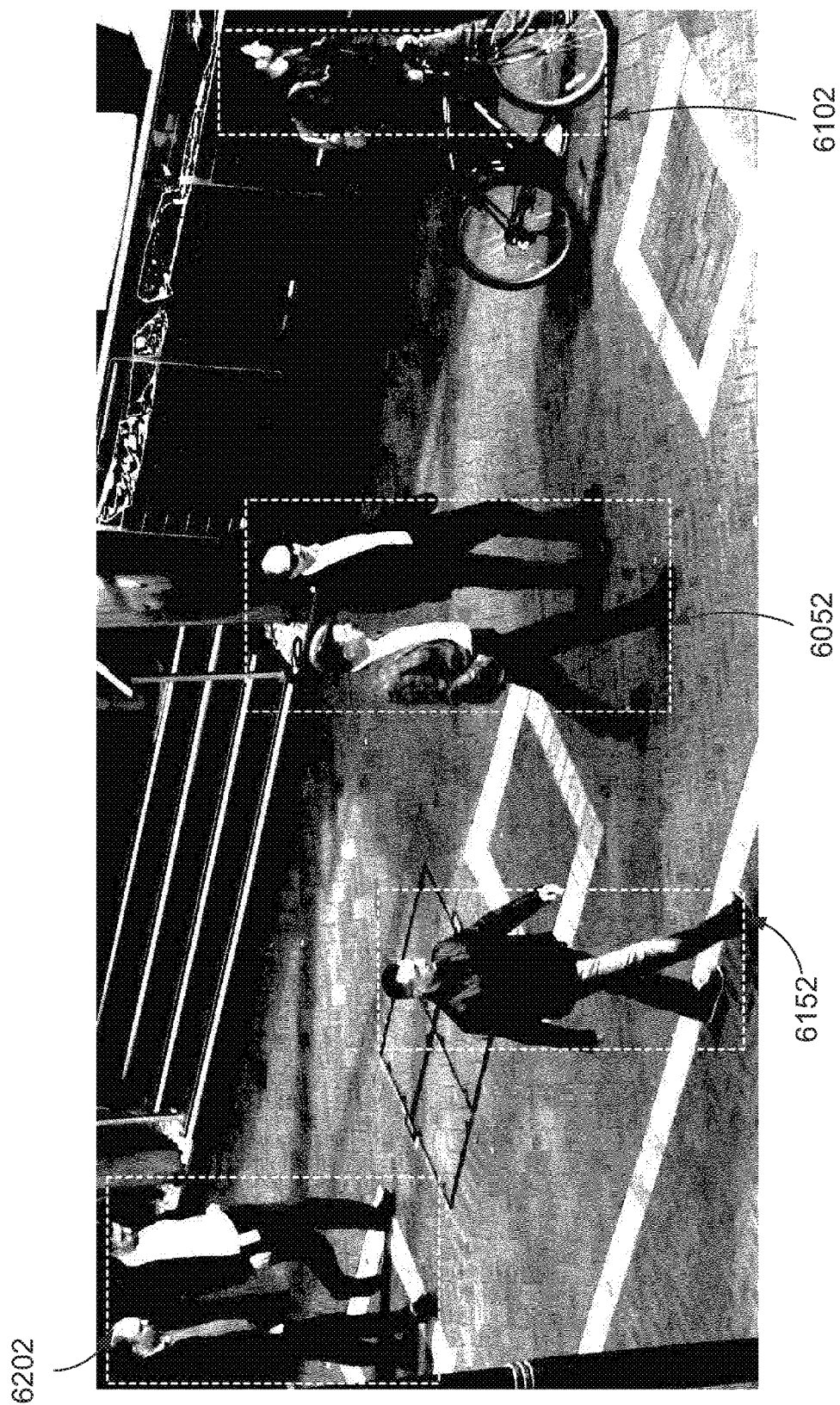
FIG. 7 provides an illustration of a CBC arrangement, showing an example of the frame streamed from camera 2.

FIG. 6 is an example of a frame streamed from camera 1 at a time t1 which is say 13:10:20. FIG. 7 is an example of a frame streamed from camera 2 at a time t2 which is say 13:10:26. In FIG. 6, there are four groups in the frame of a video stream of camera 1, namely 6051, 6101, 6151 and 6201. The group 6051 is selected by the user as the tagged target group by using a user interface such as the keyboard 102 or the mouse 103. FIG. 7 is a frame of the video stream of camera 2 at the time t2, which is the most probable time at which the groups from FIG. 6 enter the FOV of camera 2. The probable time is the time at which it is predicted that the group can be seen in the other cameras FOV. It is determined when the group is about to exit the first camera's FOV, and is computed by considering the known distance between the cameras and the velocity of the groups by using the formula distance between the cameras/velocity of the group. In this case it is assumed that the groups move with uniform velocity. The groups depicted in FIG. 6 are shown in FIG. 7. The Group 6051 in FIG. 6 is the group 6052 in FIG. 7. The group 6101 in FIG. 6 is group 6102 in FIG. 7. The group 6151 in FIG. 6 is the group 6152 in FIG. 7. The group 6201 is the group 6202 in FIG. 7. In this example, it is necessary to identify which of the groups in FIG. 7 is most probably the tagged target group 6051.

Each group has three spatio-temporal attributes namely velocity, position and time which is exit time from the first camera FOV or entry time for the second camera FOV. A position (such as 6251) of a group (such as 6051) can, in one CBC arrangement, be defined as the ground plane co-ordinates of a midpoint of a lower edge of a bounding box for the group in question, where the bounding box is a 2-D rectangle (such as 6241) around the group members as illustrated in FIG. 6. A velocity of the group is obtained by using the ground plane co-ordinate positions for a group and tracking them over time.

Position is obtained at exit time from the FOV of the first camera. Exit time is the time when a group exits out of the field of view of the first camera and entry time is the time when the group enters the field of view of the second camera.

In the description below, a subscript below the spatio-temporal attribute indicates that the spatio-temporal attribute belongs to that group. For example $V_{6051}$ is the velocity of the group 6051.

For the gallery view, (velocity, position, exit time) spatio-temporal attributes of the different groups are as follows:
Group6051: $(V_{6051}, [X, Y]_{6051}, T_{6051})$,
Group6101: $(V_{6101}, [X, Y]_{6101}, T_{6101})$
Group6151: $(V_{6151}, [X, Y]_{6151}, T_{6151})$
Group6201: $(V_{6201}, [X, Y]_{6201}, T_{6201})$
Similarly the spatio-temporal attributes (velocity, position, entry time) for the groups in the probe view are as follows:
Group 6052: $(V_{6052}, [X, Y]_{6052}, T_{6052})$,
Group6102: $(V_{6102}, [X, Y]_{6102}, T_{6102})$,
Group6152: $(V_{6152}, [X, Y]_{6152}, T_{6152})$
Group6202: $(V_{6202}, [X, Y]_{6202}, T_{6202})$.

Predict Spatio-Temporal Attributes
Obtain Predicted Context for Tagged Target Group The gallery groups in FIG. 6 are 6201, 6151, 6051 and 6101. The gallery group 6051 is the tagged target group. The step 310 predicts the spatio-temporal attributes for each of the gallery groups 6201, 6151, 6051 and 6101. These predicted spatio-temporal attributes together with the corresponding images (predicted images) of the gallery groups, constitute the predicted groups 620p, 615p, 605p and 610p, in the second camera FOV, depicted in FIG. 8, these predicted groups being associated with the corresponding gallery groups 6201, 6151, 6051 and 6101. In this case the gallery images are assumed to be the predicted images in the probe view.

FIG. 9(p) is a star graph representation depicting a predicted context for the tagged target group 6051 (having a corresponding predicted group 605p), the star graph having a source node 905p. The predicted group 605p associated with the tagged target group 6051 is represented by the centre G' (ie 905p) of the star graph in FIG. 9(p).

The other neighbouring gallery groups 6201, 6151, and 6101 with their respective predicted groups 620p, 615p, and 610p, being represented by respective nodes 920p (ie B'), 915p (ie L'), and 910p (ie C') are the other groups depicted by the star graph.

The predicted context of the tagged target group, depicted by FIG. 9(p), represents the relationship between the predicted attributes of the gallery groups where the attributes are in this case spatio-temporal attributes. This is determined by the step 315 in FIG. 3.

The predicted spatio-temporal attributes of the gallery groups are obtained as follows. The predicted velocity is the velocity of the gallery group, the predicted x value of the position is the x value of the position of the gallery group, the predicted y value of the position is the y value of the gallery group plus 10 plus a portion of field of view distance, and the predicted entry time is the time the group will be seen in the probe view, which is obtained by the exit time with the likely time required to travel the distance between the cameras in this case 10 meters.

In this illustration, the predicted spatio-temporal attributes (predicted velocity, predicted position, predicted entry time) of the four groups represented as vectors are as follows:
Group605p: $(V'_{6051}, [X',Y']_{6051}, T'_{6051})$,
Group610p: $(V'_{6101}, [X',Y']_{6101}, T'_{6101})$,
Group615p: $(V'_{6151}, [X',Y']_{6151}, T'_{6151})$,
Group620p: $(V'_{6201}, [X',Y']_{6201}, T'_{6201})$.

Rg'i' (ie 911p) is the relationship between group 605p, which is node 905p and group 615p which is node 915p which is represented by the directed edge of the graph in FIG. 9(p) and this relationship attribute is a vector obtained by taking the difference between the corresponding spatio-temporal group attributes. For example, Rg'i' is the relationship attribute which has the vector $(V'_{6151}-V'_{6051}, [X',Y']_{6151}-[X',Y']_{6051}, T'_{6151}-T'_{6051})$ which is the difference between the predicted spatio-temporal attributes of the group 6151 and the group 6051. Similarly other relationships are obtained for edges 912p and 913p. The output of the predicted context is the vector of relationship attributes.

Decompose into Local Probe Contexts

This involves, for each of the probe groups, obtaining a corresponding local probe context. FIG. 9 (a), FIG. 9(b), FIG. 9(c) and FIG. 9(d) are the local probe contexts represented by star graphs for each of the probe groups shown in FIG. 7. These are determined by the step 340 in FIG. 3.

Thus for example FIG. 9 (a) is the local probe context represented as a star graph for the group 6202.

The group 6202 has the group attributes $(5.2_{6202}, [0.9, 17.8]_{6202}, 10:26_{6202})$, where 5.2 is the velocity with which the group walks, which is 5.2 kms/hour, [0.9, 17.8] is the [x,y] positions at the centre of the bounding box in FIG. [7] of 6202 and 10:26 is the entry time when the frame was visible in the field of view of camera 2.

The group 6202 is represented by a node B (ie 920), a node L (ie 915) represents the group 6152 which has group attributes $(5_{6152}, [2.3, 21.1]_{6152}, 10:26_{6152})$, a node G (ie 905) represents the group 6052 which has group attributes $(5.0_{6052}, [0.5, 21.6]_{6052}, 10:25_{6052})$, a node C (ie 910) represents the group 6102 which has group attributes $(4_{6102}, [-1.1, 2.8]_{6102}, 10:23_{6102})$.

Rbl is a relationship attribute represented by the directed edge 926 between the nodes B and L. The relationship attribute Rbl is a vector obtained by taking the difference between the spatio-temporal attributes of B and L, and thus Rbl is the vector $(V_{6152}-V_{6202}, [X,Y]_{6152}-[X,Y]_{6202}, T_{6152}-$ $T_{6202}$). Similarly Rbg is a relationship attribute represented by a directed edge 931 between the nodes B and G, and Rbc is a relationship attribute represented by a directed edge 936 between the nodes B and C. Similarly the local probe contexts for the group 6152 is represented by FIG. 9(*b*), the local probe context for group the 6102 is represented by FIG. 9(*c*), and the local probe context for the group 6052 is represented by FIG. 9(*d*).

Compare the Probe Contexts with the Predicted Context
Inter-Group Matching

Once the predicted context (see FIG. 9(*p*)) and the local probe contexts (see FIGS. 9(*a*)-9(*d*)) have been constructed, then for each of the probe contexts, a bi-partite graph having (i) the relationship attributes of the predicted context, and (ii) the relationship attributes of the local probe context is constructed. This enables the predicted context to be compared to the local probe context to produce a corresponding distance score. This is determined by the step 380 in FIG. 3.

Figure 10:
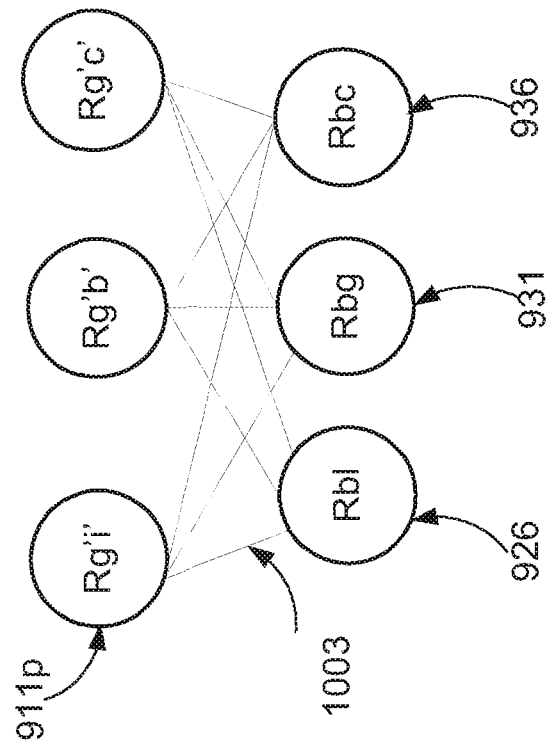
FIG. 10 provides an illustration of a CBC arrangement, showing an example of a bipartite graph with the relationships of the predicted context and probe context as the nodes.

For example, in order to compare the predicted tagged target group context FIG. 9(*p*) to the probe context FIG. 9(*a*), a bipartite graph with the relationships of the predicted context and probe context is constructed as illustrated in FIG. 10.

FIG. 10 depicts an example of a bipartite graph with relationships of the predicted tagged target context and the probe context in question as the nodes. Once the bipartite graph is constructed, a minimum cost assignment in the graph (where assigning one set of nodes to the others while the total assignment cost is minimised) is determined using the Hungarian algorithm.

An edge value which is the norm between the node vectors gets passed to the Hungarian algorithm. For example, Rg'i' is represented by a vector (4, [0.1 −7.3], 0) and Rbl is represented by a vector (0.2, [−1.4 −3.3], 0.3). The value of an edge 1003 is the Euclidean distance between the two vectors Rg'i' and Rbl.

Similarly edge values are computed for all the edges in the bipartite graph in FIG. 10 and these edge values are normalized and passed to the Hungarian algorithm to compute the minimum cost assignment, which is a distance score between the two graphs.

The distance is a real number like 2.34.

Similarly, the distance score between the predicted context FIG. 9(*p*) and other local probe contexts FIG. 9(*b*), FIG. 9(*c*) and FIG. 9(*d*) are computed. The distance scores are normalized and the one with the shortest distance (ie the best similarity score) provides the best match between the predicted context and the local probe context. Accordingly, the probe group whose local context is the closest to the predicted context is most similar to the tagged target group.

If, in the comparisons, it is found that FIG. 9(*d*) is the closest match to FIG. 9(*p*), this indicates that node G which is for group which is 6052 is most similar to node G' which the is the tagged target group 6051 with predicted attributes.

Intra-Group Matching

Further, the nodes B (ie 920), L (ie 915), C (ie 915) and G (ie 905) can be matched with G'(ie 905*p*) for intra-group matching. The spatio-temporal attributes of each of the nodes are matched with the spatio-temporal attributes by taking the Euclidean norm. For example considering ($V'_{6051}$, $[X',Y']_{6051}$, $T'_{6051}$), which are the spatio-temporal attributes of the predicted tagged target group G', and ($V_{6201}$, $[X,Y]_{6201}$, $T_{6201}$) which are the spatio-temporal attributes for the group B', a Euclidean norm gives the matching score based on the spatio-temporal attributes. Also, the score can be obtained by appearance matching, where the R, G, B colour histogram are extracted from the two images of the groups and then compared with the distance score. The intra-group similarity score in one CBC implementation can be obtained by adding the appearance score and the matching score based on spatio-temporal attributes.

The distance score between the probe contexts and the predicted context can be obtained in one CBC implementation by adding or combining the intra-group similarity score with the inter-group similarity score. The distance score is used to match the tagged target group to the probe groups. The one with the smallest score provides the match between the probe group and the gallery group.

INDUSTRIAL APPLICABILITY

The arrangements described are applicable to the computer and data processing industries and particularly for the video surveillance industry.

The foregoing describes only some embodiments of the present invention, and modifications and/or changes can be made thereto without departing from the scope and spirit of the invention, the embodiments being illustrative and not restrictive.

The invention claimed is:

1. A method of matching a tagged target group, selected from a plurality of gallery groups in a first camera field of view, with probe groups in a second camera field of view, the method comprising:
   determining a group context for the tagged target group;
   determining, in the second camera field of view, probe contexts for the respective probe groups in the second camera field of view;
   matching, using one or more processors, the group context against the probe contexts to produce respective similarity scores;
   identifying, based upon the similarity scores, the probe group that matches the tagged target group;
   determining appearance models for the tagged target group and the probe groups;
   matching the appearance model of the tagged target group against the appearance models of the probe groups to produce respective intra-group similarity distance scores; and
   identifying, based upon the intra-group similarity scores, the probe group that matches the tagged target group.

2. The method according to claim 1, wherein determining the group context further includes determining, in the second camera field of view, a predicted group context for the tagged target group.

3. The method according to claim 1, wherein the group context and the probe context are dissimilarity contexts.

4. The method according to claim 1, wherein the appearance model for the tagged target group is determined based upon the tagged target group in the first camera field of view.

5. The method according to claim 1, wherein at least one of the predicted group context and the probe context are determined based upon filter criteria.

6. An apparatus for matching a tagged target group, selected from a plurality of gallery groups in a first camera field of view, with probe groups in a second camera field of view, the apparatus comprising:
   one or more processors; and
   memory storing instructions that, when executed by the one or more processors, cause the one or more processors to function as:
   a first determining unit configured to determine a group context for the tagged target group, a second determining unit configured to determine, in the second camera field of view, probe contexts for the respective probe groups in the second camera field of view, a first matching unit configured to match the group context against the probe contexts to produce respective similarity scores, a first identifying unit configured to identify, based upon the similarity scores, the probe group that matches the tagged target group, a third determining unit configured to determine appearance models for the tagged target group and the probe groups, a second matching unit configured to match the appearance model of the tagged target group against the appearance models of the probe groups to produce respective intra-group similarity distance scores, and a second identifying unit configured to identify, based upon the intra-group similarity scores, the probe group that matches the tagged target group.

7. The apparatus according to claim 6, wherein the first determining unit further is configured to determine, in the second camera field of view, a predicted group context for the tagged target group.

8. The apparatus according to claim 6, wherein the group context and the probe context are dissimilarity contexts.

9. The apparatus according to claim 6, wherein the appearance model for the tagged target group is determined based upon the tagged target group in the first camera field of view.

10. The apparatus according to claim 6, wherein at least one of the predicted group context and the probe context are determined based upon filter criteria.

11. A non-transitory computer readable storage medium storing a computer executable program to perform a method of matching a tagged target group, selected from a plurality of gallery groups in a first camera field of view, with probe groups in a second camera field of view, the method comprising:

determining a group context for the tagged target group;

determining, in the second camera field of view, probe contexts for the respective probe groups in the second camera field of view;

matching, using one or more processors, the group context against the probe contexts to produce respective similarity scores;

identifying, based upon the similarity scores, the probe group that matches the tagged target group;

determining appearance models for the tagged target group and the probe groups;

matching the appearance model of the tagged target group against the appearance models of the probe groups to produce respective intra-group similarity distance scores; and identifying, based upon the intra-group similarity scores, the probe group that matches the tagged target group.

* * * * *